United States Patent [19]
Onoda

[11] Patent Number: 5,890,021
[45] Date of Patent: Mar. 30, 1999

[54] DISTANCE DETECTING DEVICE, FOCUS STATE DETECTING DEVICE AND CAMERA HAVING SAME

[75] Inventor: Hitoshi Onoda, Yokohama, Japan

[73] Assignee: Canon Kabushiki Kaisha, Tokyo, Japan

[21] Appl. No.: 982,142

[22] Filed: Dec. 1, 1997

[30] Foreign Application Priority Data

Dec. 5, 1996 [JP] Japan .................................. 8-325327

[51] Int. Cl.$^6$ ................................................ G03B 13/36
[52] U.S. Cl. ................................................ 396/121
[58] Field of Search ................................. 396/121, 122, 396/123, 125, 124; 250/201.2, 201.7, 201.8; 356/3.14, 3.15, 3.16, 4.03

[56] References Cited

U.S. PATENT DOCUMENTS 4,943,824  7/1990  Nabeshima et al. ................ 396/122 X
5,410,383  4/1995  Kusaka et al. ...................... 396/122 X

*Primary Examiner*—W. B. Perkey
*Attorney, Agent, or Firm*—Robin, Blecker & Daley

[57] ABSTRACT

A detecting device compares, with a threshold value, a difference or ratio between values of information on distances or defocused states of two distributed points in a distribution of distances or defocused states in an object space and determines whether two areas corresponding to the two distributed points represent one and the same object according to the result of comparison. The detecting device sets the threshold value at a value based on the information on distances or defocused states of the two distributed points subjected to determination, so that fluctuations of the determination taking place depending on distances or defocused states can be lessened.

31 Claims, 12 Drawing Sheets

|   | 0 | 1 | 2 | ... |   |   |   |   |   | m-1 |
|---|---|---|---|---|---|---|---|---|---|---|
| 0 | 1 | 1 | 1 |   |   |   |   |   |   |   |
| 1 | 1 | 1 | 1 |   |   |   |   | 2 | 2 | 2 |
| 2 |   |   | 3 | 3 |   |   |   | 2 | 2 | 2 |
|   |   |   | 3 | 3 |   | 4 | 4 |   |   |   |
| y |   | 3 | 3 | 3 | 3 | 4 | 4 |   | 6 | 6 | 6 |
|   | 5 | 3 | 3 | 3 | 3 | 4 | 4 | 4 | 6 | 6 | 6 |
|   |   | 3 | 3 | 3 | 3 | 4 | 4 | 4 |   |   |   |
| n-1 |   | 3 | 3 | 3 | 3 | 4 | 4 | 4 |   |   |   |

FIG. 11(a)
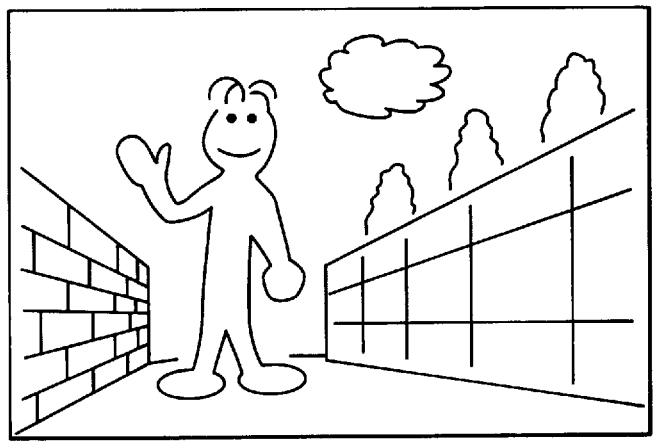
FIG. 11(b)
| | 0 | | | | | | | | | | m-1 |
|---|---|---|---|---|---|---|---|---|---|---|---|
| 0 | | | | | | ∞ | ∞ | ∞ | | | |
| | | | | 1.5 | 1.5 | ∞ | ∞ | 7.0 | | 5.0 | |
| | 1.0 | | 1.5 | 1.5 | 1.5 | | 11.0 | 7.0 | 7.0 | 1.5 | 1.2 |
| | 1.0 | 2.0 | | 1.5 | 1.5 | 1.5 | | 11.0 | 4.0 | 2.0 | 1.5 | 1.2 |
| | 1.0 | 2.0 | 4.0 | | 1.5 | 1.5 | 1.5 | 9.0 | 4.0 | 2.0 | 1.5 | 1.2 |
| | 1.0 | 2.0 | 4.0 | | 1.5 | 1.5 | | 9.0 | 4.0 | 2.0 | 1.5 | 1.2 |
| | 1.0 | 2.0 | 4.0 | | 1.5 | 1.5 | | 9.0 | 4.0 | 2.0 | 1.5 | 1.2 |
| n-1 | 1.0 | 2.0 | | 1.5 | 1.5 | 1.5 | 1.5 | | 4.0 | 2.0 | 1.5 | 1.2 |
FIG. 11(c)
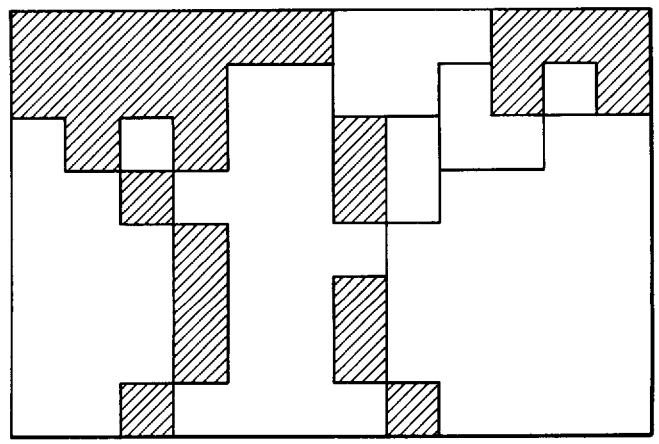

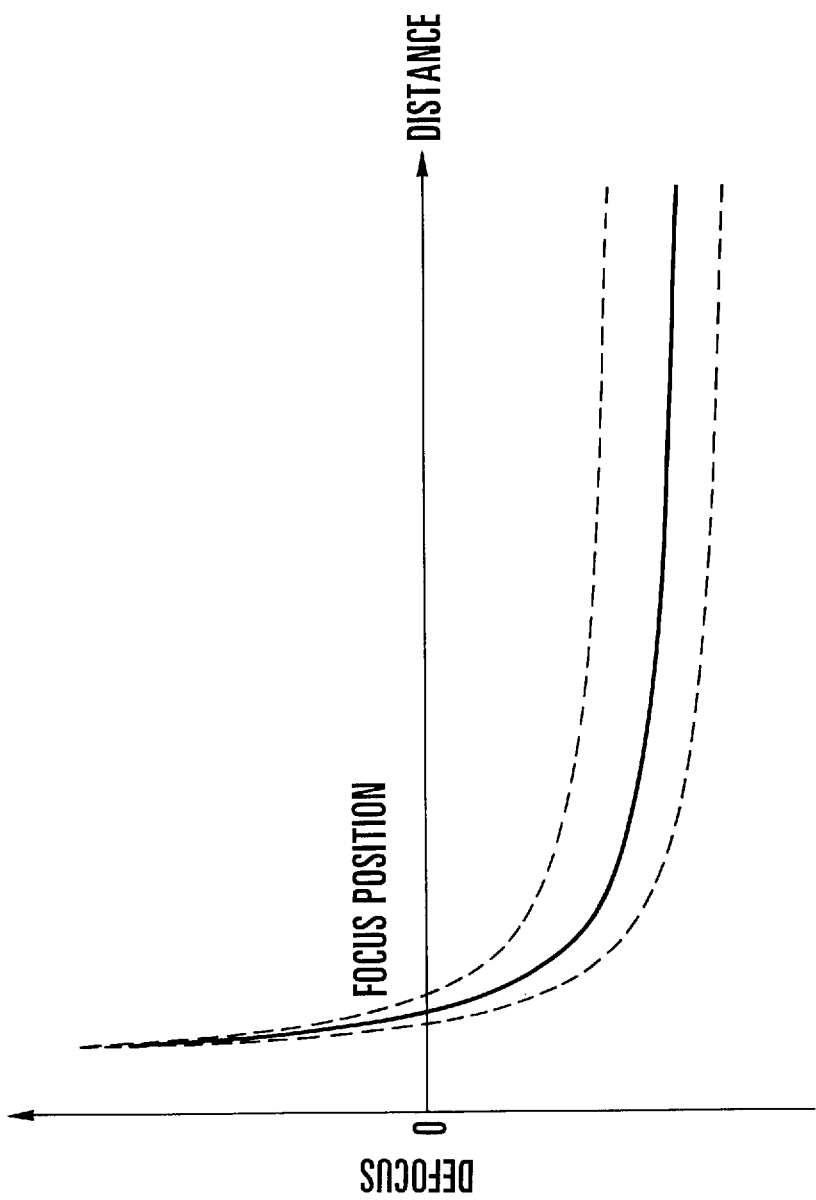

DISTANCE DETECTING DEVICE, FOCUS STATE DETECTING DEVICE AND CAMERA HAVING SAME

BACKGROUND OF THE INVENTION

1. Field of the Invention

The present invention relates to an automatic focusing device, an environment recognizing device, etc., of a camera.

2. Description of Related Art

An art of optically measuring distances to objects located in different directions is disclosed in Japanese Patent Publication No. HEI 4-67607. This art enables a camera to obtain information on a distribution of distances to objects located in a photo-taking field (hereinafter referred to as the distance distribution) or information on a distribution of defocused states in the photo-taking field (hereinafter referred to as the defocus distribution). The information permits recognition as to how objects are located in the photo-taking field.

A typical environment recognizing method which has been adopted in general is as described below.

A shot of a scene such as that shown in FIG. 11(a) is taken, for example, with a stereo camera using a CCD or the like. Two images having a parallax relative to each other are obtained by the stereo camera. Each of the two images is divided into m×n blocks. A known correlation computing operation is performed on a signal obtained from within a certain block of one of the two images and a signal obtained from a corresponding block of the other image. Then, a distance to an object within the block and an amount (degree) of defocus can be measured on the principle of trigonometric measurement. This measuring action is performed for all the blocks. As a result, information on a distribution of distances or a distribution of defocused states obtained from the m×n blocks can be obtained as shown in FIG. 11(b).

Next, to separate objects forming a phototaking field from each other on an image plane, an area dividing process is performed. The space of the phototaking field which consists of the above-stated m×n blocks is divided into areas of objects as shown in FIG. 11(c). In FIG. 11(c), hatched parts represent areas where the reliability of results of the correlation computing operation is considered to be low due to insufficiency of contrast obtained in image signals.

According to one known method of dividing the areas, parameters relative to adjacent blocks among the blocks forming the space of the photo-taking field are compared with each other to find a degree of resemblance between them. If the degree of resemblance is high, they are decided to represent the same object, and if the degree of resemblance is low, they are decided to represent different objects. Information to be used as the parameter for the area dividing process is a normal vector of surface in most cases where fine distance distribution information is obtainable. In the case of this example of prior art where information on the distance or defocus distribution is obtained in a relatively coarse state, however, the degree of resemblance is detected by simply comparing distance values or defocus values of the adjacent blocks.

For example, in the case of distance information of blocks shown in FIG. 11(b), the distance information value of one of two adjacent blocks is compared with that of the other block. If a difference in distance between the two adjacent blocks is found to be not exceeding a predetermined threshold value, the two blocks are decided to form one and the same object. If the difference in distance is found to be larger than the predetermined threshold value, the two adjacent blocks are decided to represent different objects. The comparing and deciding processes are carried out, comparing one block with another among all blocks in an adjoining relation. The whole image plane thus can be divided into areas which represent different objects. Each of the divided areas thus can be handled as a group representing one object.

The art of recognizing an environment by dividing areas for different objects within one image plane in the above-stated manner is applicable, for example, to an automatic travelling robot which decides the direction of its travel by itself, a vehicle which automatically avoids dangers by recognizing obstacles existing before and after it, etc.

The applications of the art further include an air conditioner which appositely controls its air blowing action by detecting a main object within an image plane through evaluation of areas and by deciding the direction in which a person or persons are located within a room, a camera arranged to recognize a main object of shooting and to adjust focus on the main object, and a camera arranged to be capable of measuring light only for a main object of shooting and appositely adjusting focus on the main object even in a back-light shooting condition. The art thus has a wide range of applications.

In carrying out the area dividing action, areas are decided to represent or not to represent one and the same object on the basis of a difference between the two distances as mentioned above. This method has been practiced on the assumption that, in the case of one and the same object, a surface of the object is usually slanting nearly perpendicular to an optical axis and, as a result, the difference between the two distances becomes small in such a case.

However, an interval between distance measuring points which correspond to the adjacent blocks, i.e., an interval obtained between two points not in the direction of depth but in the vertical or lateral direction on the image plane, becomes wider in proportion to the distance in the object space. FIG. 12 shows how the interval between the measuring points spreads in the object space. In FIG. 12, the abscissa axis shows an optical axis and the ordinate axis shows an optical center of an ideal image forming system. Two distance measuring points M1 and M2 are on an image forming plane. In the object space on the left side of an origin, an interval between the two measuring points becomes wider accordingly as a distance from an ideal lens (of the ideal image forming system) increases. In other words, the interval between the two measuring points is narrow when an object located at a near distance A is measured and becomes wider when another object which is located at a far distance B is measured.

Therefore, even in the case of one and the same object having a certain angle with respect to the optical axis, the difference in distance remains within a threshold value to cause the object to be judged as one and the same object if the object is measured from a near distance and becomes larger than the threshold value to cause the same object to be judged as different objects when the same object is measured from a far distance. (The threshold value of 50 cm or thereabout is adequate for an object located at a near distance, as the interval between the measuring points is narrow. However, the same threshold value becomes inadequate for an object located at a far distance, as the interval between the measuring points is wider and the object tends to be misjudged as different objects.) In other words, the result of the recognizing action varies with the distance even for the same object.

In a case where the above-stated recognizing action is to be carried out by a single-lens reflex camera, the recognizing action is performed usually on the basis of defocus information, instead of distance information. In dividing areas, therefore, two adjacent blocks are judged to form one and the same object, if a difference in defocus between the two blocks is found to be not exceeding a predetermined value.

However, the degree of defocus is in a nonlinear relation to the distance (of the object) as indicated by a full line curve in FIG. 13. The predetermined value thus does not become a fixed value in a distance space. The above-stated threshold value is a relatively small value in the distance space on the side of near distances, i.e., on the side where the degrees of defocus are in positive values, and is a relatively large value in the distance space on the side of far distances, i.e., on the side where the degrees of defocus are in negative values.

As a result of this, the area dividing action is performed for objects on the side of near distances by considering them to be different (separate) objects even when the difference in distance is small. As for objects located on the side of far distances, the area dividing action is performed by considering them to be one and the same object even in the event of such a difference in distance that permits handling them as separate (different) objects. The area dividing action thus has been performed in a disproportional manner. It is hardly possible to accurately recognize the apace of photo-taking field under such a condition.

Although the influence of defocused states is acting in the direction of offsetting an influence attributable to the above-stated relation of the object distance to the interval between the measuring points, the latter is not completely offset by the former. This is because the influence of defocus is acting in a nonlinear manner while the influence attributable to the interval is linearly acting. The adverse effect of this saliently appears in the areas of the nearest distance and those of the farthest distance in particular.

Further, with respect to the variation of the focus position of the lens, the characteristic of the relation of the degree of defocus to the distance varies in a state of shifting in parallel with the full line curve in the direction of the ordinate axis, as indicated by broken lines in FIG. 13. Therefore, the range of the threshold value in the distance space also varies with respect to changes in the current focus position of the lens. As a result, the result of the area dividing action varies when the focus position of the lens varies even for the same photo-taking field.

BRIEF SUMMARY OF THE INVENTION

In accordance with one aspect of the invention, there is provided a distance detecting device which makes a comparison between a difference or ratio between values of information on distances of two distributed points and a threshold value on the basis of information on a distribution of distances in an object space and determines, in accordance with a result of the comparison, whether two areas corresponding to the two distributed points represent one and the same object, the distance detecting device being characterized in that the threshold value is set at a value based on the information on distances of the two distributed points subjected to determination, so that fluctuations of the determination which take place depending on the distances can be lessened.

In accordance with another aspect of the invention, there is provided a focus state detecting device which makes a comparison between a difference or ratio between values of information on defocused states of two distributed points and a threshold value on the basis of information on a distribution of defocused states in an object space and determines, in accordance with a result of the comparison, whether two areas corresponding to the two distributed points represent one and the same object, the focus state detecting device being characterized in that the threshold value is set at a value based on the information on defocused states of the two distributed points subjected to determination, so that fluctuations of the determination which take place depending on the defocused states can be lessened.

These and other aspects and features of the invention will become apparent from the following detailed description of embodiments thereof taken in conjunction with the accompanying drawings.

BRIEF DESCRIPTION OF THE SEVERAL VIEWS OF THE DRAWING

FIGS. 11(a), 11(b) and 11(c) show by way of example a photo-taking scene.

FIG. 13 shows a relationship between defocused states and distances.

DETAILED DESCRIPTION OF THE INVENTION

Hereinafter, preferred embodiments of the invention will be described in detail with reference to the drawings.
(First Embodiment)

A first embodiment of the invention which is arranged to recognize the state of objects located within a photo-taking field on the basis of information on the distribution of defocused states (defocus distribution) is described below by way of example as an automatic distance measuring point selecting function of a camera.

Figure 1:
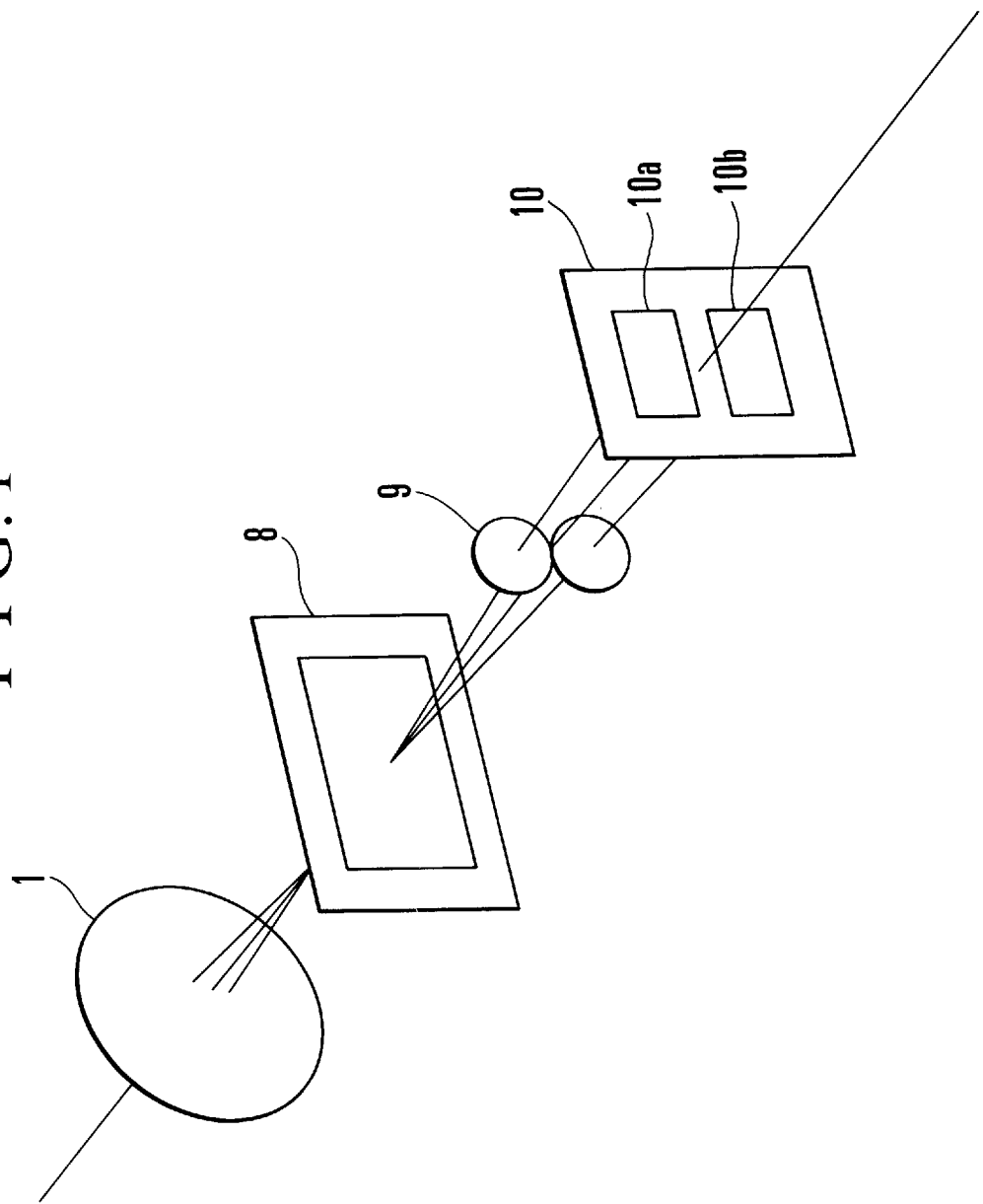
FIG. 1 schematically shows the layout of the fundamental optical system of an environment recognizing device arranged as an embodiment of the invention.

FIG. 1 shows a layout of optical elements of the camera arranged for detection of the defocus distribution within a photo-taking image plane. There are illustrated a photo-taking lens (image forming lens) 1, a field lens 8, a secondary image forming lens 9, and an area sensor 10 which is a light receiving part. The area sensor 10 has two pickup image planes 10a and 10b. Light fluxes are guided respectively to the two pickup image planes 10a and 10b from different pupil positions of the photo-taking lens 1. As a result, the light fluxes form images on the pickup image planes 10a and 10b at an image magnifying rate determined by the field lens 8 and the secondary image forming lens 9. The area sensor 10 is in a position which is optically equivalent to a photo-taking film surface with respect to the photo-taking lens 1. Each of the pickup image planes 10a and 10b has a visual field which is equal to a part of or the whole of a photo-taking image plane.

Figure 2:
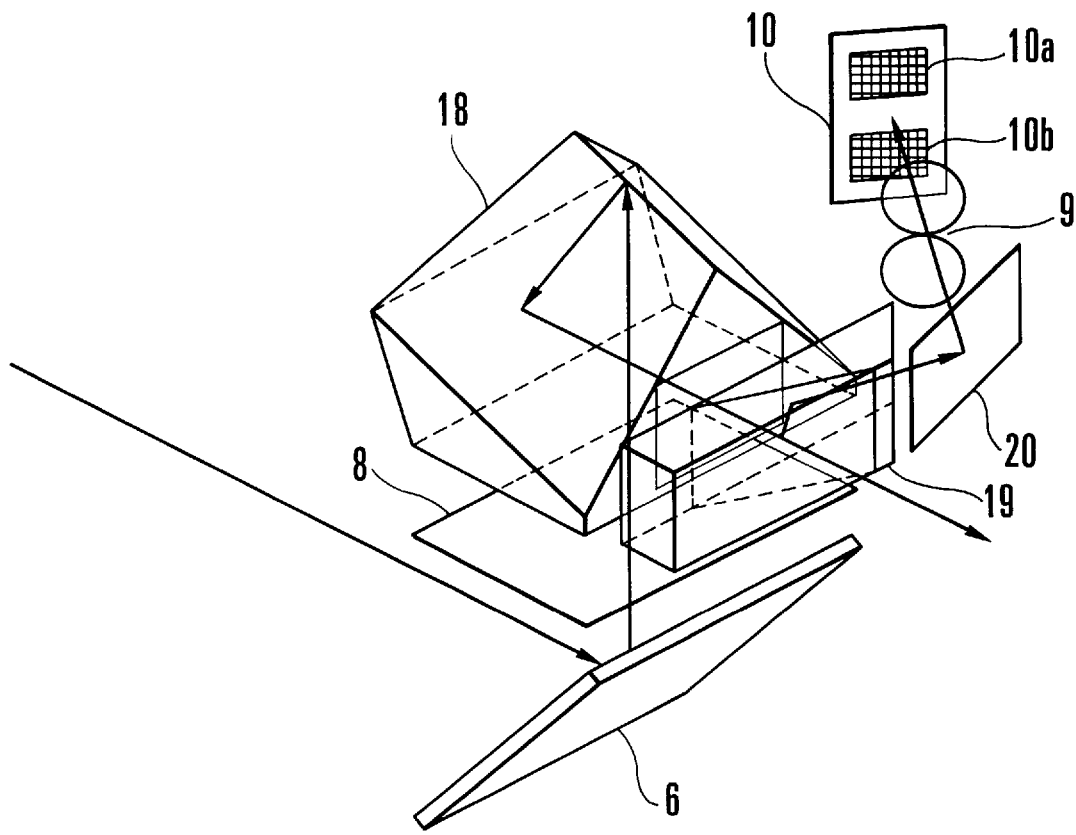
FIG. 2 is a perspective view showing the layout of the optical system of a camera where the optical system shown in FIG. 1 is arranged for the camera.

FIG. 2 shows a layout made in a case where the detecting optical system shown in FIG. 1 is applied to a camera. The camera includes a quick return mirror 6, a pentagonal prism 18, a split prism 19, a reflecting mirror 20, and other parts which are the same as those shown in FIG. 1.

Figure 3:
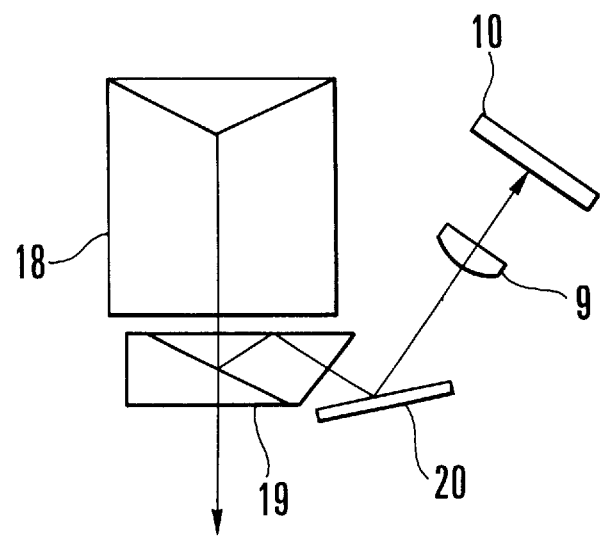
FIG. 3 is a bird's-eye view showing the layout of the optical system of the camera shown in FIG. 2.

FIG. 3 shows the layout of FIG. 2 as viewed from above the camera.

With the first embodiment arranged as described above, the pickup image planes 10a and 10b can be arranged to have a prescribed parallax.

Incidentally, a camera arranged in the same manner as described above has been disclosed in detail in Japanese Patent Application No. HEI 5-278433, etc.

Figure 4:
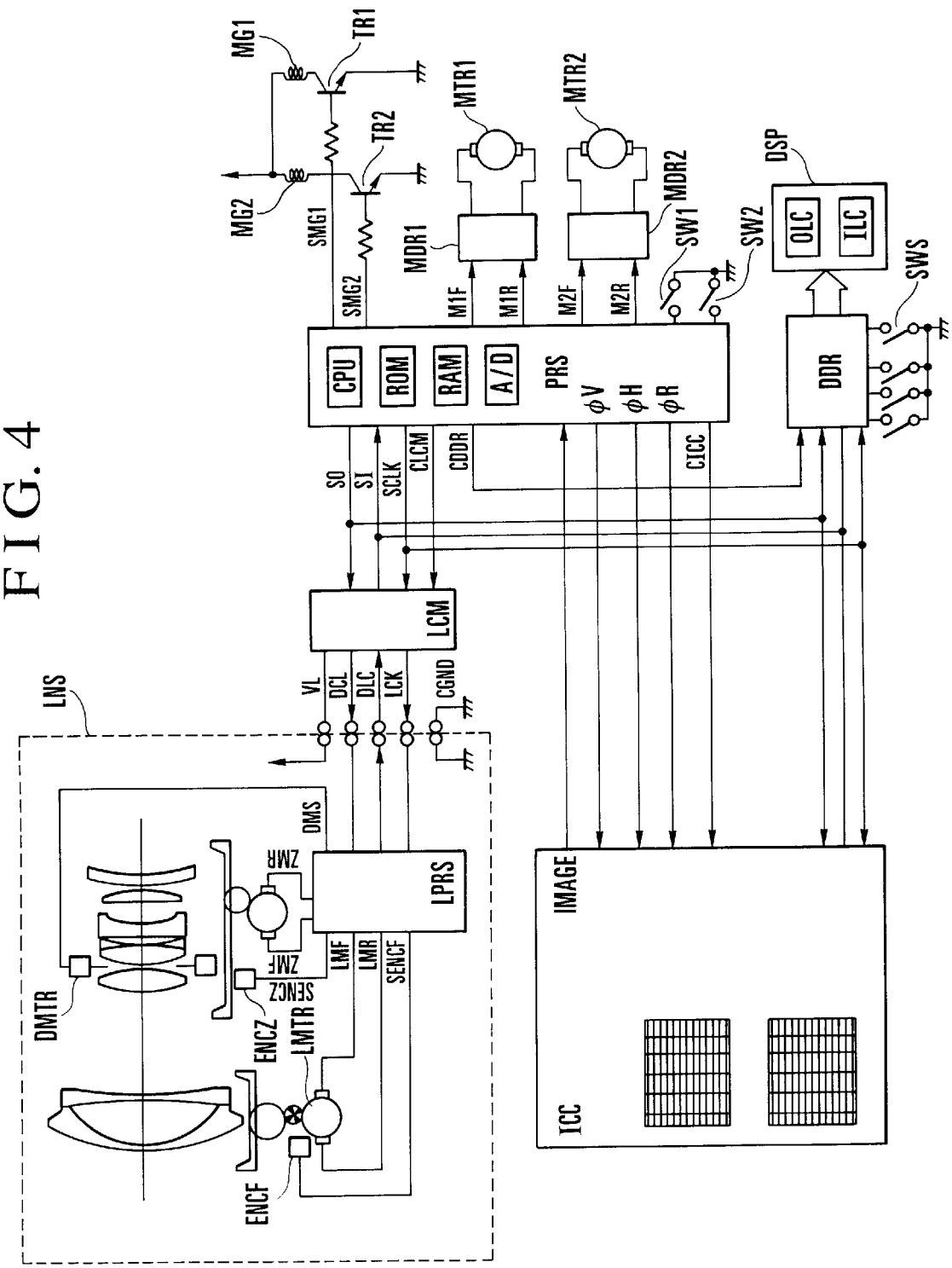
FIG. 4 is a circuit diagram showing the camera shown in FIGS. 1 and 2.

FIG. 4 is a circuit diagram showing by way of example the arrangement of a camera which is provided with the device described above.

Referring to FIG. 4, the camera is provided with a control device PRS which is a microcomputer of one chip and includes, for example, a CPU (central processing unit), a ROM, a RAM and an A/D converting function. The microcomputer PRS is arranged to perform control over a series of actions of the camera, such as an automatic exposure control function, an automatic focus adjusting function, film winding, film rewinding, etc., according to a sequence program stored in the ROM. For this purpose, the microcomputer PRS communicates with peripheral circuits disposed within the camera body and also with a control device disposed within a lens unit LNS by using communication signals SO, SI, SCLK and communication selection signals CLCM, CDDR and CICC. The microcomputer PRS thus controls various circuits and the lens unit LNS.

The microcomputer PRS outputs a data signal SO and receives a data signal SI. A synchronizing clock signal SCLK is provided for the signals SO and SI.

A lens communication buffer circuit LCM is arranged to supply power to a power supply terminal VL for the lens unit LNS when the camera is in operation and to serve as a buffer for communication between the camera body and the lens unit LNS when the selection signal CLCM from the microcomputer PRS is at a high potential level. Hereinafter, a high potential level will be abbreviated to "H" and a low potential level to "L".

When the microcomputer PRS sets the selection signal CLCM at "H" and sends out prescribed data as the signal SO in synchronism with the synchronizing clock signal SCLK, the lens communication buffer circuit LCM sends buffer signals LCK and DCL for the synchronizing clock signal SCLK and the signal SO to the lens unit LNS. At the same time, a buffer signal SI for a signal DLC from the lens unit LNS is sent out as the signal SI. The microcomputer PRS then receives data of the lens unit LNS as the signal SI in synchronism with the synchronizing clock signal SCLK.

A circuit DDR is arranged to detect and display the states of switches SWS of various kinds. The circuit DDR is selected when the selection signal CDDR is at "H", and is controlled by the microcomputer PRS by means of the signals SO, SI and SCLK. More specifically, the circuit DDR changes one display state of a display member DSP of the camera over to another according to data sent from the microcomputer PRS, and communicates the on-state and off-state of the various operation members of the camera to the microcomputer PRS. An external liquid crystal display device OLC is disposed in an upper part of the camera body. An internal liquid crystal display device ILC is disposed within a viewfinder.

Switches SW1 and SW2 are interlocked with a shutter release button which is not shown. The switch SW1 turns on when the release button is pushed down to its first step position. The switch SW2 turns on when the release button is pushed down further to its second step position. The microcomputer PRS causes a light measuring action and an automatic focus adjusting action to be performed when the switch SW1 turns on. When the switch SW2 turns on, the microcomputer PRS takes the turning-on of the switch SW2 to be a trigger signal, performs exposure control and, after that, causes a film winding action to be carried out.

The switch SW2 is connected to an interruption input terminal of the microcomputer PRS. Therefore, even while a program is still in process of execution with the switch SW1 in its on-state, an interruption is allowed to shift control immediately to a prescribed interruption program when the Switch SW2 turns on.

A motor MTR1 is provided for film transport. A motor MTR2 is provided for moving a mirror up or down and also for charging a shutter spring. Motor driving circuits MDR1 and MDR2 are arranged respectively to control the forward and backward rotations of the motors MTR1 and MTR2. Signals M1F, M1R, M2F and M2R are motor control signals to be supplied from the microcomputer PRS respectively to the motor driving circuits MDR1 and MDR2.

Magnets MG1 and MG2 are provided respectively for causing the leading and trailing screens of the shutter to start traveling. The magnets MG1 and MG2 are arranged to be energized by signals SMG1 and SMG2 and amplifying transistors TR1 and TR2 to operate the shutter under the control of the microcomputer PRS.

Since the motor driving circuits MDR1 and MDR2 and the shutter control are not directly related to the invention, the details of them are omitted here.

A signal DCL which is inputted to an inside-lens control circuit LPRS in synchronism with a clock signal LCK from the lens communication buffer circuit LCM is instruction data for the lens unit LNS. Actions to be performed by the lens unit LNS in accordance with the instruction is predetermined. Upon receipt of the signal DCL, the inside-lens control circuit LPRS analyzes the instruction data carried by the signal DCL in accordance with prescribed procedures. After completion of the analysis, the inside-lens control circuit LPRS controls focus adjustment and the diaphragm aperture and outputs information, as a signal DLC, on the operating states of various parts of the lens unit LNS (such as a focusing optical system driving state, a diaphragm driving state, etc.) and various parameters (such as a full-open F-number, a focal length, a coefficient of a relation between a defocused amount and a moving amount of the focusing optical system, a focus correcting amounts of various kinds, etc.).

In the case of the first embodiment, the camera is using a zoom lens. Therefore, when an instruction for adjusting focus is sent from the camera body, the inside-lens control circuit LPRS sends a signal LMF or LMR to a focusing motor LMTR to drive the focusing motor LMTR according to information on the amount and direction of driving received along with the instruction. Then, the focusing motor LMTR makes focus adjustment by moving the optical system in the direction of an optical axis. The moving amount of the optical system is detected by an encoder circuit ENCF. The circuit ENCF is arranged to output a number of pulses according to the moving amount of the optical system by detecting the moving amount with a photo-coupler through the pattern of a pulse disk which is arranged to rotate in association with the movement of the optical system. The inside-lens control circuit LPRS monitors a pulse signal SENCF of the encoder circuit ENCF and counts the number of pulses carried by the signal SENCF with a counter disposed inside of the inside-lens control circuit LPRS. Upon completion of the moving action on the optical system, the inside-lens control circuit LPRS brings the motor LMTR to a stop by setting the signal LMF or LMR at a low level ("L").

Therefore, after the instruction for adjustment of focus is sent from the camera body, the microcomputer PRS of the camera body has nothing to do with lens driving until completion of lens driving performed on the side of the lens unit LNS. Further information on the content (count value) of the above-stated counter is arranged to be sent to the camera body upon request from the camera body.

Upon receipt of an instruction for control over the aperture of a diaphragm from the camera body, a known stepping motor DMTR which is provided for driving the diaphragm is driven according to information on a number of stopping-down steps sent along with the instruction.

Since the stepping motor permits open control, its operation can be monitored without using any encoder.

An encoder circuit ENCZ is disposed at a zooming optical system and is arranged to send a signal SENCZ to the inside-lens control circuit LPRS. The control circuit LPRS detects a zooming position through the signal SENCZ from the encoder circuit ENCZ. The control circuit LPRS stores therein lens parameters for zooming positions. Upon receipt of a request from the microcomputer PRS on the side of the camera body, the control circuit LPRS sends to the camera body a parameter corresponding to a current zooming position.

A light measuring area sensor ICC which is composed of a CCD, etc., is provided for focus detection and exposure control. The light measuring area sensor ICC is selected when a signal CICC of the microcomputer PRS is at "H" (a high level). The microcomputer PRS controls the light measuring area sensor ICC through the signals SO, SI and SCLK.

Signals $\phi V$, $\phi H$ and $\phi R$ of the microcomputer PRS are for reading and resetting the output of the area sensor ICC. Sensor control signals are formed, on the basis of these signals from the microcomputer PRS, by a driving circuit which is disposed within the area sensor ICC. Outputs of the area sensor ICC are amplified after they are read out from a sensor part. The amplified outputs are then sent out as an output signal IMAGE to an analog input terminal of the microcomputer PRS. Upon receipt of the signal IMAGE, the microcomputer PRS A/D-converts it into digital values. The digital values thus obtained are serially stored at applicable addresses on the RAM. An environment recognizing action on the photo-taking field, a focus adjusting action and a light measuring action are carried out by using the digital signals thus obtained.

In FIG. 4, the camera (body) and the lens (lens unit) are shown as separate bodies on the assumption that the camera is using an interchangeable lens. However, the invention is not limited to such a system but is applicable, without any problem, to a camera having a lens and a camera body arranged in one body.

Figure 5:
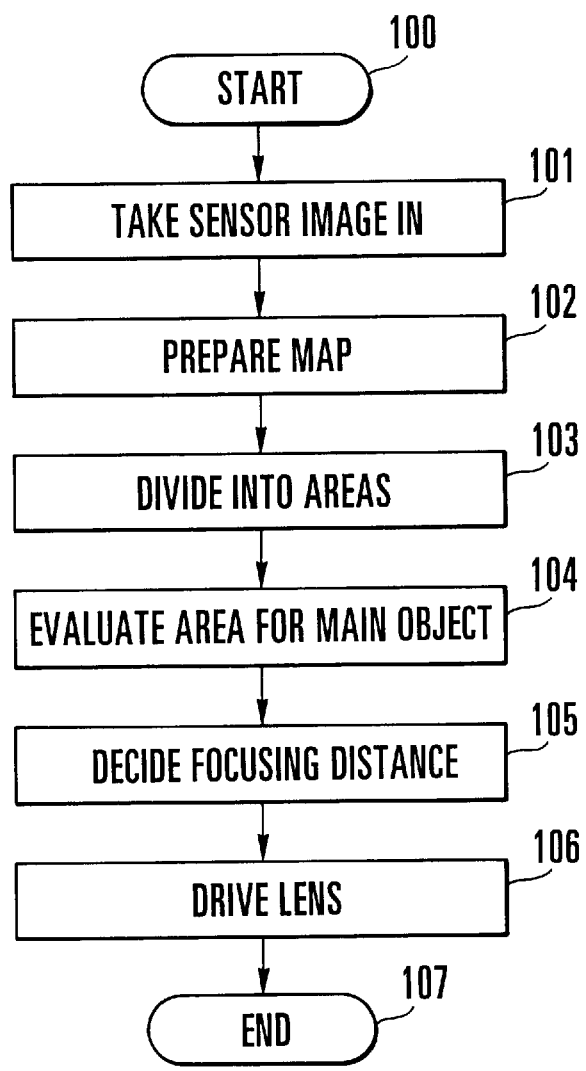
FIG. 5 is a flow chart showing a fundamental operation of the embodiment of the invention.

FIG. 5 is a flow chart showing a fundamental operation, according to the invention, of a camera which is of the kind arranged to recognize the state of objects by preparing information on a defocused state or distance distribution, to focus the lens on a main object after detection of the main object, to measure the quantity of light of the main object, and to adjust conditions of an exposure for the main object according to the measured light quantity. Among these actions, the flow chart sets importance on an action of selecting a distance measuring point with the main object determined by recognizing the environment in accordance with the invention.

When the camera operator pushes a (shutter) release button, the switch SW1 turns on. Then, the CPU of the camera begins to perform control, as shown in FIG. 5, in accordance with a program stored at a ROM.

Referring to FIG. 5, an image obtained by the sensor is taken in at a step 101. The sensor image is taken in in the following manner. The sensor is first reset. More specifically, the control signals $\phi V$, $\phi H$ and $\phi R$ are simultaneously set at "H" (high level) for a predetermined period of time at the microcomputer PRS. As a result, a reset action is carried out within the area sensor ICC.

An accumulation start instruction is next sent from the microcomputer PRS to cause a process of accumulation to begin. After that, an end of the accumulating process is detected.

Then, the sensor outputs IMAGE are serially read out by driving the control signals $\phi V$ and $\phi H$. At the microcomputer PRS, the sensor outputs IMAGE are A/D-converted and digital image (data) signals thus obtained are stored in predetermined areas IMG1 and IMG2 of the RAM of the microcomputer PRS. The execution of the step 101 is thus completed.

At a step 102, defocus distribution information, i.e., a defocus map, is prepared for m×n blocks (m and n are integers which are at least "1") is prepared.

Figure 6:
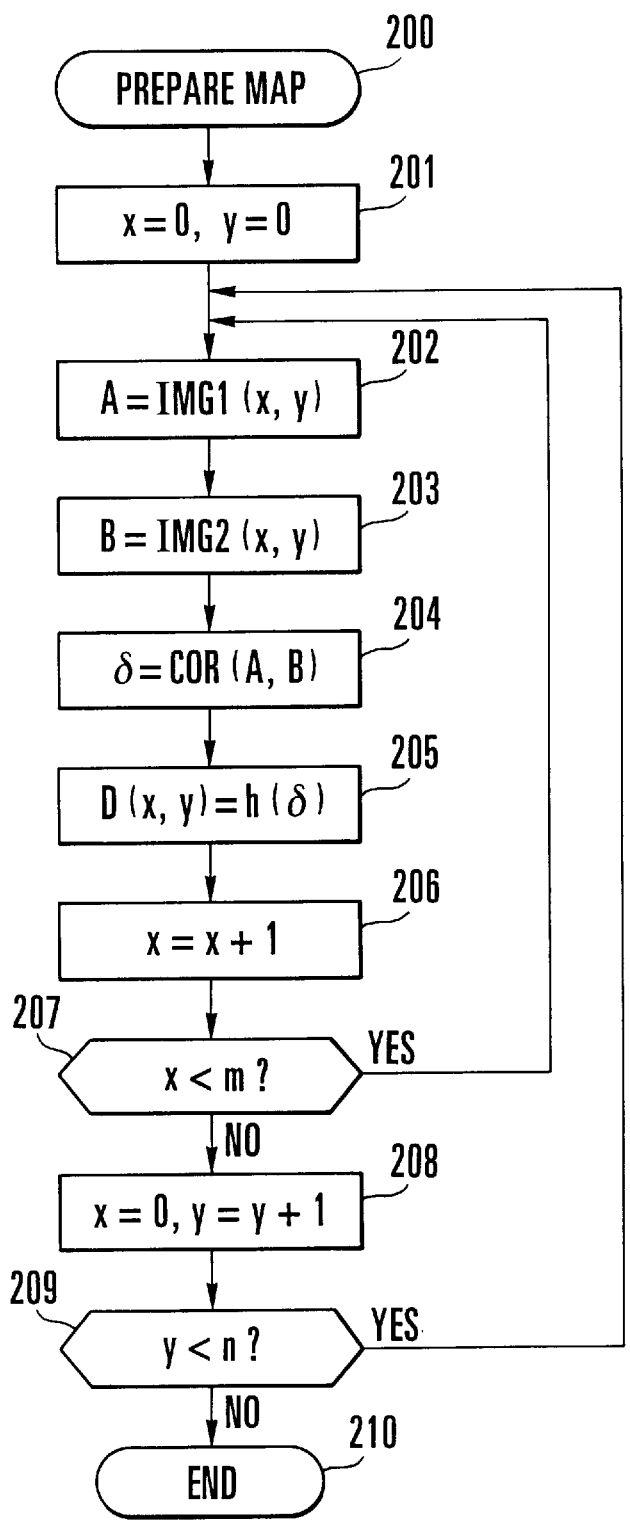
FIG. 6 is a flow chart showing the details of a map preparing step shown in FIG. 5.

FIG. 6 shows in a flow chart the details of the defocus map preparing process to be carried out at the step 102. Referring to FIG. 6, at a step 201, variables x and y which indicate the coordinates of the blocks are initialized.

At a step 202, a signal which is necessary for a defocus computing operation on one of the blocks (x, y) is extracted from the image data IMG1 on the RAM. The signal thus extracted is copied at a predetermined address A on the RAM.

At the next step 203, another signal which is also necessary for the defocus computing operation is extracted from the image data IMG2 and is copied at a predetermined address B on the RAM.

At a step 204, a correlation computing operation COR(A, B) is carried out in a known manner on the luminance distribution signals recorded at the addresses A and B to obtain an amount of discrepancy $\delta$ between the two image signals.

At a step 205, a defocus computing operation is carried out with a function $h(\delta)$ in a known manner to obtain a value of defocus. The defocus value thus obtained is stored at a predetermined address D(x, y) which is reserved on the RAM for recording a distribution of distances.

At a step 206, the value of the variable x is incremented by one to shift the object of process to an adjoining block.

At a step 207, the variable x is compared with a value of resolution m in the direction of x of the defocus map. If the resolution value m is found to be larger than the variable x, i.e., a condition "x<m" is found to be true (YES), the flow of operation returns to the step 202 to compute a defocus value and store it for the adjoining block in the direction of x in the same manner as the steps described above. If the condition "x <m" is found at the step 207 to be false (NO), the flow proceeds to a step 208. At the step 208, the variable x is initialized and the other variable y is incremented by one.

At a step 209, the value of the variable y is checked for a condition "y<n". If the result of the check for the condition is found to be true (YES), the flow again returns to the step 202 to carry out the same computing operations for the next column of blocks. If the result of the check made at the step 209 for the condition "y<n" is found to be false (NO), the defocus computing processes are completed for all the blocks. The flow then proceeds to a step 210 to end the preparation of a distance map.

Figure 7:
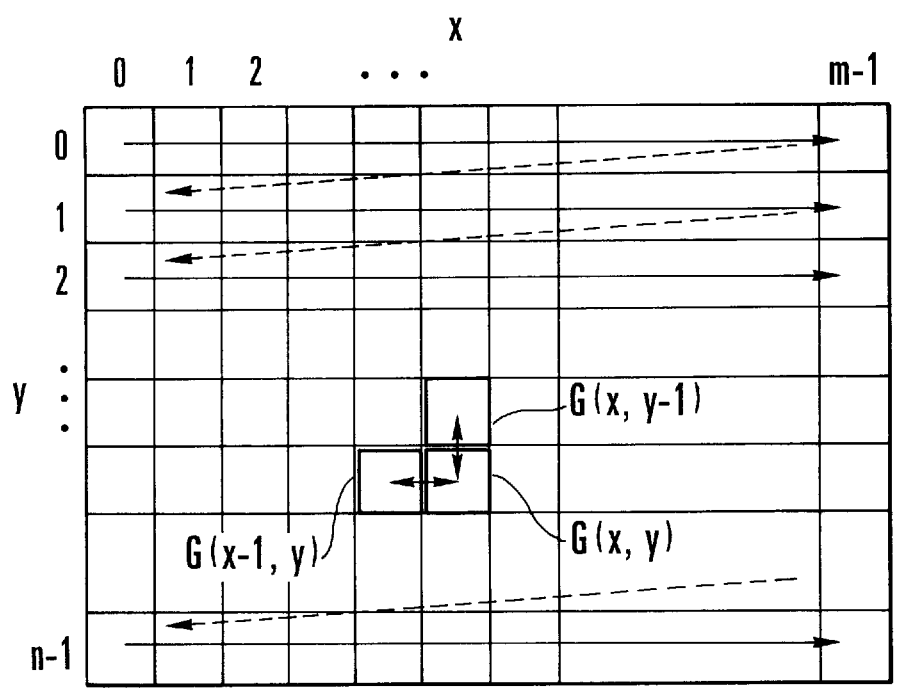
FIG. 7 shows how areas are divided.

Again referring to FIG. 5, at a step 103, an area dividing action is performed in the following manner. The area dividing action is performed, for example, by raster-scanning the image plane starting from a block located at a left upper corner as indicated by an arrow in FIG. 7. With a block under examination assumed to be a block G(x, y), an adjoining block G(x, y−1) above the block G(x, y) and another adjoining block G(x−1, y) on the left side of the block G(x, y) are examined to find if they belong to one and the same group. By virtue of this deciding process, every adjacent blocks on the image plane can be eventually decided to be in or not to be in one and the same group. In this case, the blocks in the uppermost row (y=0) and in the leftmost column (x=0) have no block above and on the left side of them. The above-stated deciding process is, therefore, not performed for them.

The results of the deciding process is stored in memory parts G(0, 0) to G(m−1, n−1) of the RAM. The block having its coordinates (x, y) at (0, 0) is first registered as belonging to a group having a group number g at "1". The group number g is incremented by one every time a block is found to belong to a group of a different area and the group number is assigned to the block.

Figures 8A, 8B:
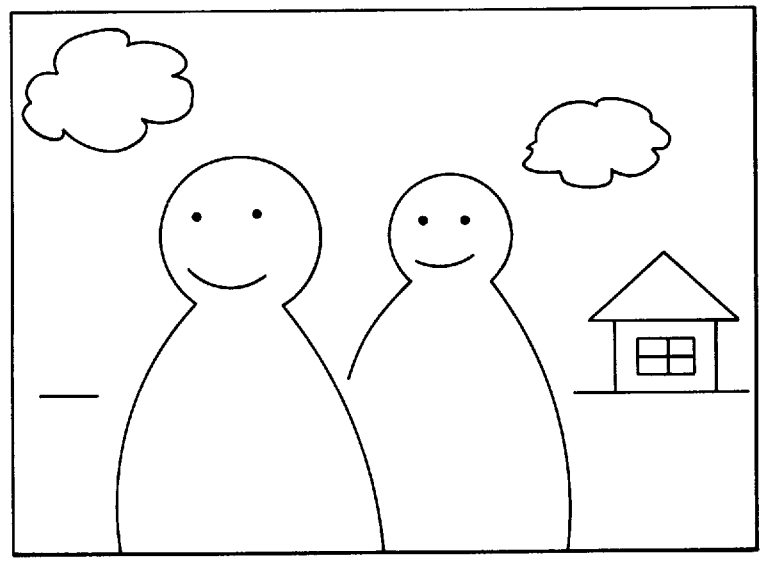
FIGS. 8(a) and 8(b) show by way of example a result of labeling.

In the case of a photo-taking scene which is for example as shown in FIG. 8(*a*), the blocks (areas) on the image plane are grouped and group numbers are assigned to the groups as shown in FIG. 8(*b*) by the process described above.

Such a numbering process has been known by the name of "labeling method". Therefore, the flow of an area dividing operation is not fully described herein. However, an algorithm of "deciding whether or not adjacent blocks belong to one and the same group" which represents a key point of the invention and is to be carried out as a part of the area dividing operation is next described below.

Figure 9:
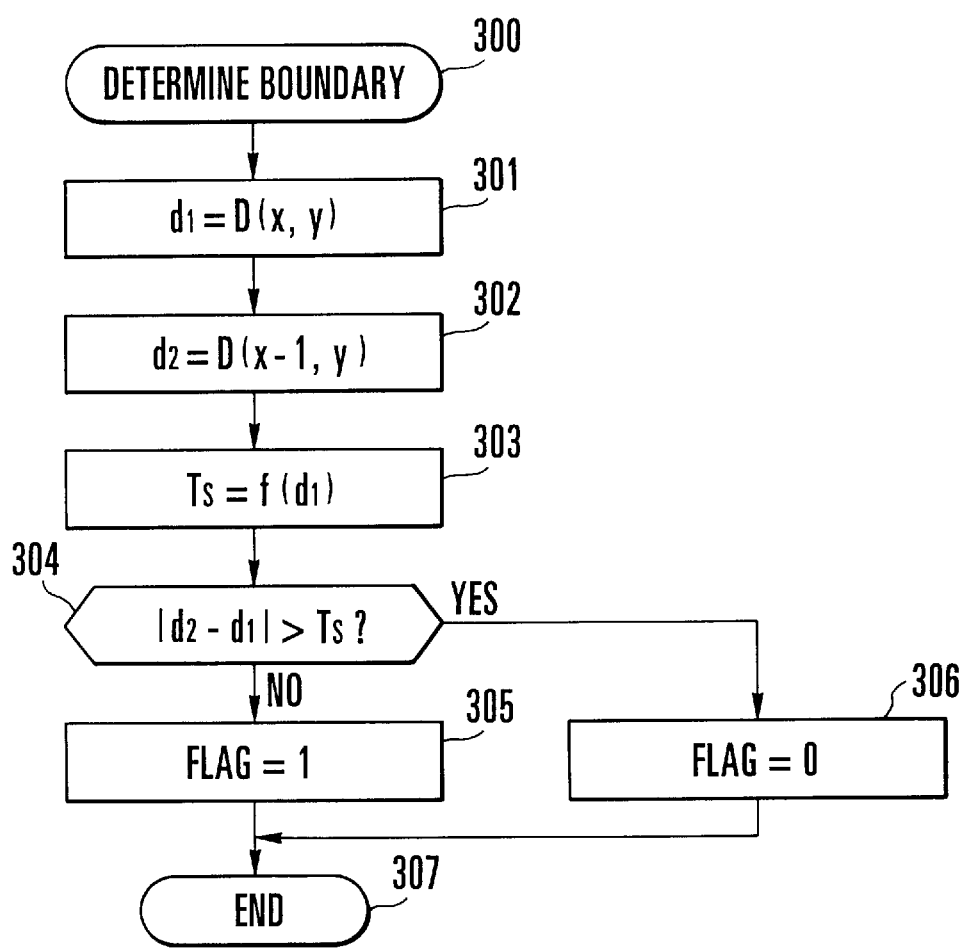
FIG. 9 is a flow chart showing a boundary determining action performed according to the invention.

FIG. 9 shows in a flow chart an operation to be performed, during a scanning process, for deciding whether a block G(x, y) which is under examination and another block G(x−1, y) which is a comparing block and is on the left side of the block under examination represent one and the same object or represent different objects.

Referring to FIG. 9, at a step 301, the defocus value D(x, y) of the block under examination G(x, y) is copied as a working variable $d_1$. At the next step 302, the defocus value D(x−1, y) of the comparing block G(x−1, y) is copied as another working variable $d_2$.

At a step 303, a function f is computed with the defocus value $d_1$ of the block under examination G(x, y) used as an argument. The result of this computing operation is set as a threshold value Ts.

The following describes in detail a function f(d) which determines a threshold value most apposite to the defocus value d of the block under examination.

For accurately suppressing the inequality of the area dividing process for objects locating at near and far distances, it is considered to be an accurate method to examine an object surface formed by two adjacent blocks to find if an angle formed between the object surface and the optical axis is equal to or more than a predetermined angle. This method is described in detail as follows.

Figure 10:
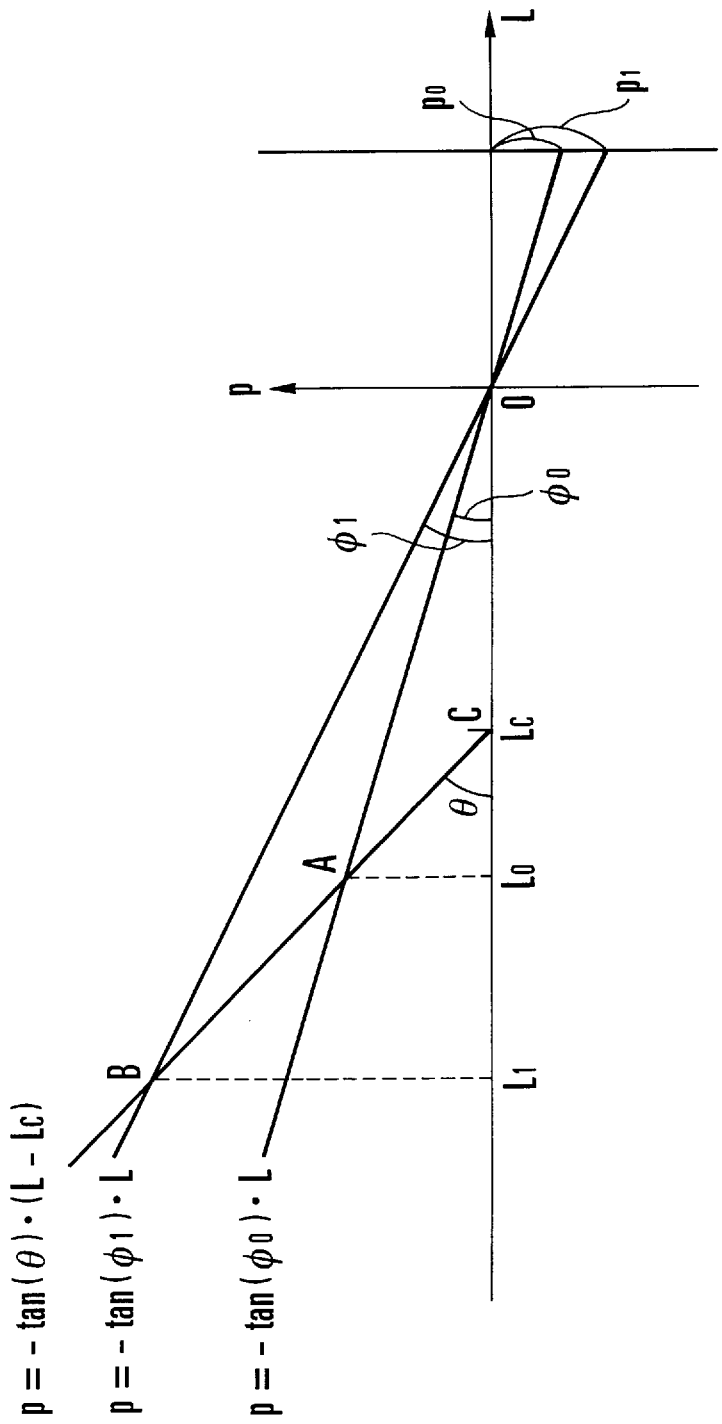
FIG. 10 is a diagram for explaining an ideal threshold value.
Figure 12:
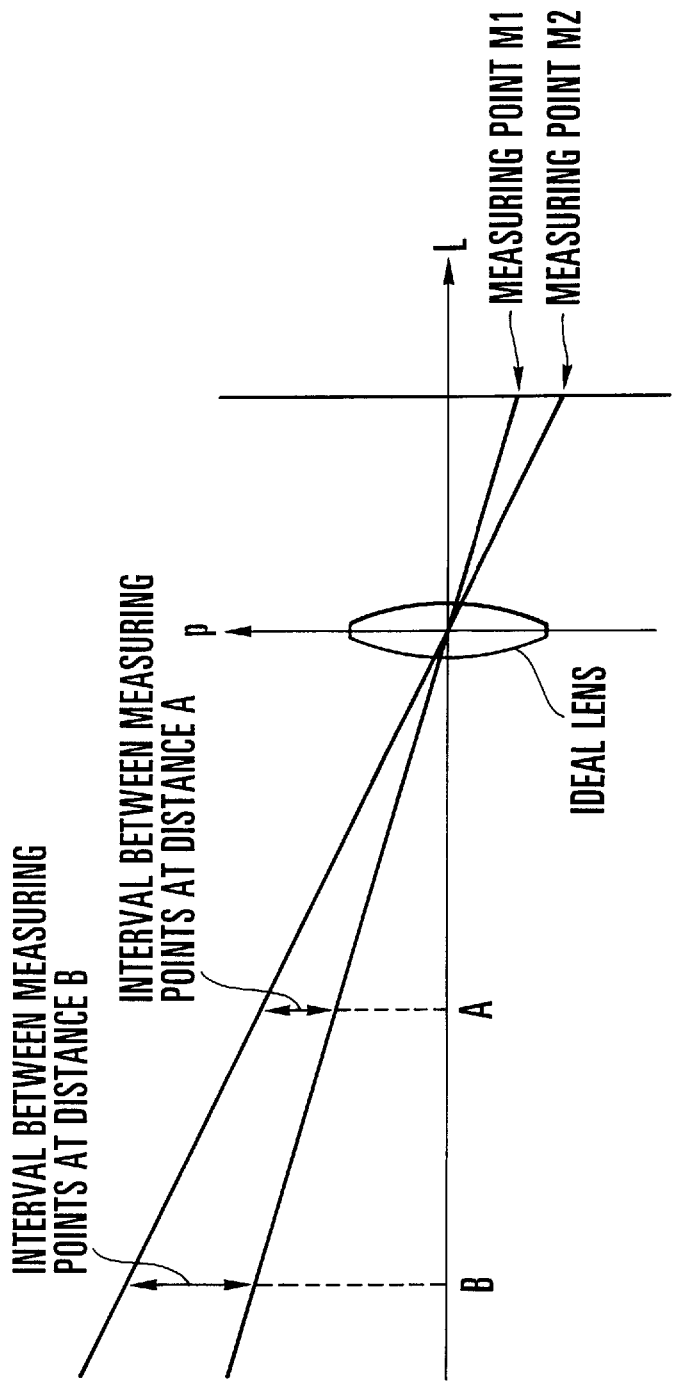
FIG. 12 shows how an interval between measuring points spread in an object space.

Referring to FIG. 10 which shows this method, a point O indicates the origin of a coordinate system and is also assumed to be an ideal optical center of an image forming system. The abscissa axis indicates an optical axis. An object space exists on the left side of the origin. On the right side of FIG. 10, a line which is in parallel with the ordinate axis represents an image forming plane of the optical system. Two adjacent distance measuring points $P_0$ and $P_1$ are provided on the image forming plane for measuring distances. In this case, distance information values obtained at these two points are compared with each other.

When the distance measuring points $P_0$ and $P_1$ are respectively connected to the origin O, the connecting lines form angles with the optical axis. These angles are respectively assumed to be $\phi_0$ and $\phi_1$. Areas wherein objects observable at the distance measuring points $P_0$ and $P_1$ are respectively on straight lines "p=−L tan $\phi_0$" and "p=−L tan $\phi_1$".

In a case where distances measured at the distance measuring points $P_0$ and $P_1$ are respectively $L_0$ and $L_1$, the objects are located at a point $A(L_0, -L_0 \tan \phi_0)$ and a point $B(L_1, -L_1 \tan \phi_1)$. A plane formed by these two points can be considered to represent an object surface. An angle $\theta$ formed by this plane and the optical axis can be obtained from the following formula:

$$\theta = \tan^{-1}\left(\frac{L_1 \tan\phi_1 - L_0 \tan\phi_0}{L_0 - L_1}\right).$$

If the absolute value of this angle $\theta$ is larger than a prescribed threshold angle, the objects form the plane nearly perpendicular to the optical axis and thus can be considered to be one and the same object. If the angle $\theta$ is smaller than the threshold angle, they can be considered to be separate (different) objects.

Assuming that a distance from the origin O to an intersection point C of the object surface and the optical axis is $L_c$, a distance difference "$L_0-L_1$" can be expressed by the following formula:

$$L_0 - L_1 = \left(\frac{\tan\theta}{\tan\theta - \tan\phi_0} - \frac{\tan\theta}{\tan\theta - \tan\phi_1}\right) \times L_c.$$

It is apparent from the formula that the distance difference "$L_0-L_1$" increases in proportion to the distance $L_c$. Therefore, in order to detect a prescribed angle from the distance difference, the threshold value Ts is arranged to be in a proportional relation to the distance L, as expressed below:

$$Ts = C_1 L$$

where C , represents a constant decided from a threshold angle $\theta_T$, a distance "a" from the optical center to the object surface, the positions of the distance measuring points, etc.

The constant $C_1$ can be expressed as follows:

$$C_1 = \left( \frac{1}{\tan\theta_T - \frac{P_0}{a}} - \frac{1}{\tan\theta_T - \frac{P_1}{a}} \right) \times \tan\theta_T.$$

Since the constant $C_1$ includes the distance measuring points $P_0$ and $P_1$, it should be computed for every part in the adjoining relation. However, in a case where distributed points are located at equal intervals and a difference between the points $P_0$ and $P_1$ is sufficiently small with respect to the distance "a", the value of the constant $C_1$ does not much vary for any part of the adjoining relationship on the image plane. In view of this, the constant $C_1$ does not have to be computed every time. The constant $C_1$ may be obtained by computing only one representative value thereof. The representative value of the constant $C_1$ may be used in computing the adjoining relationship.

The threshold value to be used in detecting uniformity of angles from distances thus can be obtained in the above-stated manner.

Means for setting an angle uniformity detecting threshold value from a defocused state is next described.

The defocus value d and the distance L are in the following relationship:

$$d = (1/f_L - 1/L)^{-1} - C_2.$$

In the above formula, $f_L$ represents the focal length of the optical system, and $C_2$ is a value which is determined by the focal length $f_L$ and an assumed focus position $L_F$. The value $C_2$ can be expressed as follows:

$$C_2 = (1/f_L - 1/L_F)^{-1}.$$

According to these relations, a function f which determines the threshold value from defocused states can be expressed as follows:

$$f(d) = C_1(1/f_L - 1/(d+C_2))^{-1}.$$

The use of the threshold value determined by the function f gives the same advantageous effect as in a case where objects located at any distances are checked to find if they are one and the same object. Therefore, it effectively solves the problem of the prior art which lies in that objects at near distances are finely divided while objects at far distances are coarsely divided.

In a case where the camera is the lens-shutter type having its initial focus position remain unvarying, the above-stated "assumed focus position $L_F$" can be set at the initial position. However, in the case of a single-lens reflex camera or the like where its focus position varies, the assumed focus position $L_F$ is preferably set for the most frequently using photo-taking distance, such as 2 m or thereabout. Further, in the case of a camera using an interchangeable lens, values such as the values $C_1$ and $C_2$ are arranged to be suitably set according to the focal length of the lens. Such an arrangement always permits adequate recognition irrespectively of the lens in use.

In the case of a zoom lens or the like, the values $C_1$ and $C_2$ can be adequately set by detecting the current focal length by means of the encoder circuit ENCZ shown in FIG. 4 or the like, so that recognition can be always adequately made irrespectively of focal length.

While a method for accurately eliminating any adverse effect of distances has been described above, it is not necessary to completely eliminate the adverse effect. Therefore, in a case where it is rather preferable to reduce the amount of computing operations, a simpler function which lessens the threshold value accordingly as the defocused amount increases may be employed as the function f. For example, such a simpler function can be expressed as $f(d) = C_3/d$ ($C_3$: some suitable constant). Introduction of such a function still permits improvement over the conventional recognition process with a less amount of computing operations.

The description of the flow of operation shown in FIG. 9 is resumed as follows.

Again referring to FIG. 9, at a step 304, a check is made to find if the absolute value of difference in defocus amounts is larger than the threshold value. If not, the flow proceeds to a step 305. If so, the flow proceeds to a step 306. At the step 305, a flag variable FLAG which is arranged to indicate whether or not the two blocks represent one and the same object is set at "1" to show that the two objects are one and the same object. At the step 306, the flag variable FLAG is set at "0" to show that the two objects are separate objects. After these steps, the flow of the boundary deciding operation comes to an end.

The above-stated deciding operation is performed on all blocks of adjoining relationship. After that, the area dividing action is finished.

At the above-stated step 303, the threshold value Ts is set in accordance with either the formula "$f(d) = C_1(1/f_L - 1/(d+C_2))^{-1}$" or another formula "$f(d) = C_3/d$".

In these formulas, the variable d may be either a variable $d_2$ or an average value of variables $d_1$ and $d_2$.

The description of the flow of operation shown in FIG. 5 is resumed as follows.

At the step 304, the characteristics of areas (or groups) forming the photo-taking space are evaluated and a group representing a main photo-taking object is selected and decided from among all the groups.

For example, in the case of FIG. 11(c), every group is checked for an area assumable to represent a main object by computing an average of defocused amounts and the width, height and position in the image plane, etc., of an area under evaluation and by evaluating the results of the computation as a whole.

A conceivable function for evaluating the status of a main object can be expressed, for example, as follows:

(main object status)=$W_1$×(width)×(height)+$W_2$/(distance from center of image plane) −$W_3$×(average amount of defocus).

In the above-stated formula, $W_1$, $W_2$ and $W_3$ represent weighting constants, "(distance from center of image plane)" means a distance between the center of the image plane and the barycenter position of the applicable area, and "(average amount of defocus)" means an average of defocused amounts of all blocks included in the area under evaluation. The computing operation is carried out on every one of areas of the image plane. After that, an object showing the largest value of the main object status among others is considered to be a main object.

At a step 105 in FIG. 5, one defocus amount is decided on the basis of information on the defocused state of an area which is decided to represent the main object. The lens is then driven and moved to an extent corresponding to the defocus amount. The defocus amount is decided by taking into consideration, among other factors, an averaged value of all blocks included in the area and the defocus amount of a block located at the nearest distance within the area.

The computing operations of the steps 102 to 105 are carried out by the microcomputer PRS.

At the next step 106, the microcomputer PRS sends an instruction for focus adjustment to the lens unit LNS to adjust focus according to the defocus amount decided at the step 105. The control circuit LPRS of the lens unit LNS then controls the motor LMTR to adjust focus for the main object. The focus adjusting action is carried out to focus the lens on the main object.

As described above, in the area dividing action, two adjacent blocks are checked to find if they represent one and the same object. In this instance, the threshold value is decided according to the defocus values of the adjacent blocks compared with each other. Therefore, all the objects can be compared under the same conditions irrespective of their distances. This arrangement solves the problem of the method of the prior art that the areas of objects at near distances are finely divided while those of objects at far distances are coarsely divided.

In the case of the first embodiment, results of an environment recognizing action are used in detecting focus. An exposure is decided according to information on the luminance of an area considered to be a main object of shooting. By virtue of that arrangement, a picture can be taken with the exposure adequately adjusted to the main object even under an unfavorable condition such as a back-light shot or the like. The luminance of objects can be measured by luminance measuring means similar to a means employed by a known split light measuring type camera. It is also possible to use an area sensor ICC as light measuring means and to detect the distribution of luminance of a photo-taking field through the gain of the luminance output of the area sensor ICC.

The above-stated arrangement of the first embodiment is applicable also to an automatic zoom type camera which is arranged to automatically adjust the angle of view to have a main object in a suitable size by adjusting its focal length with zoom motors ZMF and ZMR in such a way as to allow the main object to occupy, for example, 50% of area within an image plane.

While the defocus map in the first embodiment is prepared for m×n blocks arranged in a grid-like shape, the distribution of the defocus measuring blocks does not have to be in a grid-like shape but may be differently arranged, for example, in a zigzag shape. The processes described can be carried out in the same manner by such a modification without any problem.

(Second Embodiment)

A second embodiment of the invention which is a camera arranged to recognize the locations and states of objects within a photo-taking field on the basis of information on a defocus distribution is next described.

The second embodiment is arranged in the same manner as the first embodiment in respect to the optical component elements as shown in FIG. 1, the layout of a detecting optical system in a camera as shown in FIG. 2, and the shape of layout as viewed from above as shown in FIG. 3. Therefore, these points of the second embodiment are omitted from the following description.

The details of the circuit arrangement of the second embodiment as a camera are also about the same as those of the first embodiment shown in FIG. 4. However, the second embodiment differs from the first embodiment in the action of the encoder ENCF of the lens unit LNS.

In the first embodiment, the pulse signal of the encoder ENCF is arranged to indicate a lens moving amount for focus adjustment. In the case of the camera of the second embodiment, on the other hand, a pattern showing focus positions is recorded on a pulse disk which is interlocked with an optical system. The focus position is arranged to be detectable by means of a plurality of photo-couplers ENCF (only one of them is shown) and their output signals SENCF (only one of them is shown).

The output signal SENCF of each of the photo-couplers ENCF is inputted to the control circuit LPRS to allow the control circuit LPRS to monitor the current focus position of the lens.

When a request is sent to the control circuit LPRS from the camera body, information on the current focus position of the lens is sent from the camera body.

The actual environment recognizing processes are similar to the flow of operation in the first embodiment shown in FIG. 5. In the case of the second embodiment, however, the areas dividing step 103 is executed in a different manner.

The details of the step 103 are similar in outline to the flow of operation shown in FIG. 9. At the step 304 in FIG. 9, however, the second embodiment decides the threshold value in a manner which differs from the threshold value deciding manner of the first embodiment.

The second embodiment differs particularly in respect to the function f(d) to be used in determining a threshold value most apposite to the defocus value d of the block under deciding examination.

While the above-stated function is considered to be used for ideal recognition, it is conceivable to examine and find if an object surface formed by two adjacent blocks and the optical axis are at an angle larger than a certain threshold angle.

Therefore, in the case of the second embodiment, the focus position outputted from the control circuit LPRS of the lens unit is substituted for the focus position $L_F$ in the above-stated formula "$d=(1/f_L-1/L)^{-1}-C_2$" or "$f(d)=C_1(1/f_L-1/(d+C_2))^{-1}$" in the first embodiment.

This method for deciding the threshold value gives the same advantageous effect as a case where the check for one and the same object is made on the basis of a threshold angle θ for any object distance. Therefore, this method not only eliminates the inequality of the area dividing process of the prior art for near and far objects but also permits a threshold angle to be clearly set, so that recognition can be very accurately carried out.

Further, an actual computing operation may be carried out not exactly in compliance with the formula "$f(d)=C_1(1/f_L-1/(d+C_2))^{-1}$". A sufficiently adequate result of recognition can be attained by using a similar formula which approximately coincides with this formula.

The area of a main object can be detected and the focus can be adjusted to the main object by carrying out processes as set forth by the flow charts of FIGS. 5 and 9 to recognize the environment.

In judging whether or not adjacent blocks belong to one and the same object in the area dividing action, an apposite threshold value is decided according to the defocus values of the blocks under deciding comparison and the focus position of the lens, so that the blocks can be compared with each other under the same condition irrespective of the defocus values of the blocks and the focus position of the lens. Therefore, the arrangement of the second embodiment effectively solves the problem of the method of the prior art which lies in that the areas are divided finely for near objects and coarsely for far objects. Besides, correct evaluation of surface inclinations of the objects according to the invention permits highly accurate environment recognition.

In the second embodiment, as described above, the result of environment recognition is used for focus detection. A picture can be taken with an exposure adjusted to a main object even under unfavorable shooting conditions, such as a back-light shot, by deciding the exposure on the basis of information on the luminance of an area considered to be the main object. The luminance can be measured either by using a measuring means similar to a means employed in a known split light measuring type camera or by using an area sensor ICC as light measuring means to detect the luminance distribution of a photo-taking field from the luminance output of the area sensor ICC and the gain of the sensor.

The arrangement of the second embodiment is applicable also to an automatic zoom type camera which is arranged to automatically adjust the angle of view to have a main object in a suitable size by adjusting its focal length with zoom motors ZMF and ZMR in such a way as to allow the main object to occupy, for example, 50% of area within an image plane.

While the defocus map of the second embodiment is prepared for m×n blocks arranged in a grid-like shape, the distribution of the defocus measuring blocks does not have to be in a grid-like shape but may be differently arranged, for example, in a zigzag shape. The processes described can be carried out in the same manner by such a modification without any problem.

(Third Embodiment)

A third embodiment of the invention is a camera arranged to recognize the locations and states of objects in a phototaking field on the basis of information on a distance distribution within the field.

The arrangement of the camera as a whole is the same as that of the second embodiment shown in FIGS. 1 to 4 and is, therefore, omitted from description.

The third embodiment operates also similarly to the second embodiment. However, the third embodiment differs from the second embodiment in the map preparing process of the step 102, the area dividing process of the step 103 and the main object evaluating process of the step 104.

In the map preparation routine of the step 102, the third embodiment prepares information on a distance distribution, i.e., a distance map, instead of a defocus map. The flow of operation for distance map preparation is the same as the flow shown in FIG. 6 except a function h(δ) shown at the step 205. In the case of the third embodiment, the distance value L of each address (x, y) is obtained from an image discrepancy amount δ, a current focus position $L_F$ and a focal length f in accordance with the following formula:

$$L = \left( \frac{1}{f} - \frac{1}{\left( \frac{1}{f} - \frac{1}{L_F} \right)^{-1} + \delta} \right)^{-1}.$$

A distance map is prepared by storing the distance value L at the address D(x, y) on the RAM.

The area dividing process of the step 103 in FIG. 5 is next executed. Then, "the algorithm for deciding whether or not adjacent blocks belong to one and the same group" which is a key point of the invention is carried out as described below.

The threshold value shown at the step 303 in FIG. 9 is differently set in the third embodiment. While a threshold value set by the prior art arrangement remains unvarying, the third embodiment sets the threshold value according to the values of distances under deciding comparison.

A difference in distance "$L_0-L_1$" shown in FIG. 10 is in a proportional relation to the object distance as expressed by the following formula:

$$L_0 - L_1 = \left( \frac{\tan\theta}{\tan\theta - \tan\phi_0} - \frac{\tan\theta}{\tan\theta - \tan\phi_1} \right) \times L_c.$$

Therefore, in order to decide whether or not the inclination of an object is larger than a prescribed angle, the threshold value is set either on the basis of the following relation or according to a relation similar to the following relation:

$Ts = C\, d_1$ where Ts represents the threshold value, C is a constant, and $d_1$ is the distance value of one of two adjacent distributed points.

At the step 304 in FIG. 9, values $d_1$ and $d_2$ used for a check respectively represent distance values stored at the addresses D(x, y) and D(x-1, y) at the steps 301 and 302. Further, in the relation of $Ts = C\, d_1$, although the value $d_1$ is preferably the above-stated distance value $d_1$, an average value of the distance values $d_1$ and $d_2$ may be used as the value $d_1$.

With the threshold value set in this manner, the same advantageous effect is attainable also in finding one and the same object from a distance distribution as in the case where the angles of objects are detected.

Next, in the case of the third embodiment, the main object evaluating process of the step 104 in FIG. 4 is executed as follows.

The main object evaluating process of the third embodiment differs from the first and second embodiments in that the evaluation for an main object is carried out by using functions expressed in the following formula:

(main object status)=$W_1$×(width)×(height)+$W_2$/(distance from center of image plane) −$W_3'$/(average distance).

In the formula above, $W_1$, $W_2$ and $W_3'$ represent weighting constants, "(distance from center of image plane)" means a distance between the center of the image plane and the barycenter position of the applicable area, and "(average distance)" means an average of distances of all blocks included in the area under evaluation. The computing operation is carried out on every one of areas of the image plane. After that, an object showing the largest value of the main object status among others is considered to be a main object.

With the exception of this, the processes of the third embodiment are the same as those of the second embodiment and are, therefore, omitted from description.

As described above, in the area dividing action, two adjacent blocks are checked to find if they represent one and the same object. In this instance, the threshold value is decided according to the distance values of the adjacent blocks compared with each other. All objects thus can be compared under the same conditions irrespective of their distances. The arrangement of the third embodiment thus solves the problem of the method of the prior art that the areas of objects at near distances are finely divided while those of objects at far distances are coarsely divided.

Further, the step 304 in FIG. 9 is executed by comparing a difference in distance value or a difference in defocus value with the threshold value. However, this step may be changed in such a way as to compare a ratio between two distance values or a ratio between two defocus values with the threshold value and to decide objects showing the ratio at a larger value than the threshold value to be different objects.

I claim:

1. A distance detecting device which makes a comparison between a difference or ratio between values of information on distances of two distributed points and a threshold value on the basis of information on a distribution of distances in an object space and determines, in accordance with a result of the comparison, whether two areas corresponding to the two distributed points represent one and the same object, said distance detecting device being characterized in that:

said threshold value is set at a value based on the information on distances of the two distributed points subjected to determination.

2. A distance detecting device according to claim 1, wherein said information on the distribution of distances is obtained by a distance measuring device which measures distances to a plurality of different areas in the object space, a comparison between a difference or ratio between values of information on distances of two adjacent distributed points and said threshold value is made for every distributed point, and the object space is divided into areas for respective different objects in accordance with a result of the comparison.

3. A distance detecting device according to claim 1, wherein said threshold value is set according to at least one of distance information values in the information on distances of the two distributed points subjected to determination and is set at a larger value accordingly as said distance information value indicates a farther distance.

4. A distance detecting device according to claim 1, wherein said threshold value is set on the basis of a relation which is expressed by or approximate to the following formula:

$$Ts = C \cdot L$$

where Ts is said threshold value, C is a constant, and L is an information value corresponding to a distance of one of two adjacent distributed points.

5. A distance detecting device according to claim 1, further comprising a main object area detecting circuit which detects an area of a main object from among areas which are divided for respective different objects.

6. A focus state detecting device which makes a comparison between a difference or ratio between values of information on defocused states of two distributed points and a threshold value on the basis of information on a distribution of defocused states in an object space and determines, in accordance with a result of the comparison, whether two areas corresponding to the two distributed points represent one and the same object, said focus state detecting device being characterized in that:

said threshold value is set at a value based on the information on defocused states of the two distributed points subjected to determination.

7. A focus state detecting device according to claim 6, wherein said information on the distribution of defocused states is obtained by a measuring device which measures defocused states of a plurality of different areas in the object space, a comparison between a difference or ratio between values of information on defocused states of two adjacent distributed points and said threshold value is made for every distributed point, and the object space is divided into areas for respective different objects in accordance with a result of the comparison.

8. A focus state detecting device according to claim 6, wherein said threshold value is set according to at least one of defocused state information values in the information on defocused states of the two distributed points subjected to determination and is set at a smaller value accordingly as said defocused state information value increases.

9. A focus state detecting device according to claim 6, wherein said threshold value is set on the basis of a relation which is expressed by or approximate to the following formula:

$$Ts = C_1 \frac{1}{\frac{1}{f_L} - \frac{1}{d + C_2}}$$

where Ts is said threshold value, d is an information value corresponding to a defocused state of one of two adjacent distributed points, $f_L$ is a focal length of a defocus measuring optical system, and $C_1$ and $C_2$ are constants.

10. A focus state detecting device according to claim 6, further comprising a main object area detecting circuit which detects an area of a main object from among areas which are divided for respective different objects.

11. A focus state detecting device which makes a comparison between a difference or ratio between values of information on defocused states of two distributed points and a threshold value on the basis of information on a distribution of defocused states in an object space and determines, in accordance with a result of the comparison, whether two areas corresponding to the two distributed points represent one and the same object, said focus state detecting device being characterized in that:

said threshold value is set at a value based on the information on defocused states of the two distributed points subjected to determination and information on a focus position of a detecting optical system which detects the distribution of defocused states.

12. A focus state detecting device according to claim 11, wherein said information on the distribution of defocused states is obtained by a measuring device which measures defocused states of a plurality of different areas in the object space, a comparison between a difference or ratio between values of information on defocused states of two adjacent distributed points and said threshold value is made for every distributed point, and the object space is divided into areas for respective different objects in accordance with a result of the comparison.

13. A focus state detecting device according to claim 11, wherein said threshold value is set according to at least one of defocused state information values in the information on defocused states of the two distributed points subjected to determination and is set at a smaller value accordingly as said defocused state information value increases, and a relation between said defocused state and said threshold value is made to vary in such a relation as to shift in parallel in an axial direction of said defocused state in accordance with the focus position.

14. A focus state detecting device according to claim 11, wherein said threshold value is set on the basis of a relation which is expressed by or approximate to the following formula:

$$Ts = C_1 \frac{1}{\frac{1}{f_L} - \frac{1}{d + \frac{1}{\frac{1}{f_L} - \frac{1}{L_F}}}}$$

where Ts is said threshold value, d is an information value corresponding to a defocused state of one of two adjacent distributed points, $f_L$ is a focal length of a detecting optical system, $L_F$ is the focus position of said detecting optical system, and $C_1$ is a constant.

15. A focus state detecting device according to claim 11, further comprising a main object area detecting circuit which detects an area of a main object from among areas which are divided for respective different objects.

16. A camera having a distance detecting device which makes a comparison between a difference or ratio between values of information on distances of two distributed points and a threshold value on the basis of information on a distribution of distances in an object space and determines, in accordance with a result of the comparison, whether two areas corresponding to the two distributed points represent one and the same object, said camera being characterized in that:

said threshold value is set at a value based on the information on distances of the two distributed points subjected to determination.

17. A camera having a distance detecting device according to claim 16, wherein said information on the distribution of distances is obtained by a distance measuring device which measures distances to a plurality of different areas in the object space, a comparison between a difference or ratio between values of information on distances of two adjacent distributed points and said threshold value is made for every distributed point, and the object space is divided into areas for respective different objects in accordance with a result of the comparison.

18. A camera having a distance detecting device according to claim 16, wherein said threshold value is set according to at least one of distance information values in the information on distances of the two distributed points subjected to determination and is set at a larger value accordingly as said distance information value indicates a farther distance.

19. A camera having a distance detecting device according to claim 16, wherein said threshold value is set on the basis of a relation which is expressed by or approximate to the following formula:

$$Ts = C \, L$$

where Ts is said threshold value, C is a constant, and L is an information value corresponding to a distance of one of two adjacent distributed points.

20. A camera having a distance detecting device according to claim 16, further comprising a main object area detecting circuit which detects an area of a main object from among areas which are divided for respective different objects.

21. A camera having a distance detecting device according to claim 20, further comprising a focus position deciding circuit which decides one focus position on the basis of values distributed within said area on the basis of a result of detection outputted from said main object area detecting circuit, and a focus adjusting circuit which adjusts focus of a lens on the basis of an output of said focus position deciding circuit.

22. A camera having a distance detecting device according to claim 20, further comprising a light measuring circuit which measures a quantity of light of the area of the main object on the basis of a result of detection outputted from said main object area detecting circuit, and exposure adjusting means for adjusting a quantity of exposure on the basis of an output of said light measuring circuit.

23. A camera having a distance detecting device according to claim 20, further comprising an automatic focal length adjusting circuit which adjusts a focal length of a lens so as to obtain an image of the main object in a suitable size on the basis of a result of detection outputted from said main object area detecting circuit.

24. A camera having a focus state detecting device which makes a comparison between a difference or ratio between values of information on defocused states of two distributed points and a threshold value on the basis of information on a distribution of defocused states in an object space and determines, in accordance with a result of the comparison, whether two areas corresponding to the two distributed points represent one and the same object, said camera being characterized in that:

said threshold value is set at a value based on the information on defocused states of the two distributed points subjected to determination.

25. A camera having a focus state detecting device according to claim 24, wherein said information on the distribution of defocused states is obtained by a measuring device which measures defocused states of a plurality of different areas in the object space, a comparison between a difference or ratio between values of information on defocused states of two adjacent distributed points and said threshold value is made for every distributed point, and the object space is divided into areas for respective different objects in accordance with a result of the comparison.

26. A camera having a focus state detecting device according to claim 24, wherein said threshold value is set according to at least one of defocused state information values in the information on defocused states of the two distributed points subjected to determination and is set at a smaller value accordingly as said defocused state information value increases.

27. A camera having a focus state detecting device according to claim 24, wherein said threshold value is set on the basis of a relation which is expressed by or approximate to the following formula:

$$Ts = C_1 \frac{1}{\frac{1}{f_L} - \frac{1}{d + C_2}}$$

where Ts is said threshold value, d is an information value corresponding to a defocused state of one of two adjacent distributed points, $f_L$ is a focal length of a defocus measuring optical system, and $C_1$ and $C_2$ are constants.

28. A camera having a focus state detecting device according to claim 24, further comprising a main object area detecting circuit which detects an area of a main object from among areas which are divided for respective different objects.

29. A camera having a focus state detecting device according to claim 28, further comprising a focus position deciding circuit which decides one focus position on the basis of values distributed within said area on the basis of a result of detection outputted from said main object area detecting circuit, and a focus adjusting circuit which adjusts focus of a lens on the basis of an output of said focus position deciding circuit.

30. A camera having a focus state detecting device according to claim 28, further comprising a light measuring circuit which measures a quantity of light of the area of the main object on the basis of a result of detection outputted from said main object area detecting circuit, and exposure adjusting means for adjusting a quantity of exposure on the basis of an output of said light measuring circuit.

31. A camera having a focus state detecting device according to claim 28, further comprising an automatic focal length adjusting circuit which adjusts a focal length of a lens so as to obtain an image of the main object in a suitable size on the basis of a result of detection outputted from said main object area detecting circuit.

* * * * *

UNITED STATES PATENT AND TRADEMARK OFFICE
CERTIFICATE OF CORRECTION

PATENT NO. : 5,890,021
DATED : March 30, 1999
INVENTOR(S) : Hitoshi Onoda

It is certified that error appears in the above-identified patent and that said Letters Patent is hereby corrected as shown below:

Col. 3, line 29, delete "apace" and insert -- space --.
Col. 8, line 21, delete "in in the" and insert -- in the --.
Col. 8, line 40, delete "is prepared".
Col. 9, line 28, after "every" insert -- set of --.
Col. 9, line 35, delete "is" and insert -- are --.
Col. 10, line 65, delete "C," and insert -- $C_1$ --.
Col. 11, line 53, delete "thereabout" and insert -- thereabouts --.
Col. 12, line 53, before "areas" insert -- the --.
Col. 15, line 14, before "area" insert -- the --.
Col. 15, line 42, after "except" insert -- for --.
Col. 16, line 42, before "areas" insert -- the --.
Col. 17, line 1, delete "value" and insert -- value, --.
Col. 17, line 42, delete "value" and insert -- value, --.
Col. 18, line 20, delete "value" and insert -- value, --.
Col. 19, line 6, delete "value" and insert -- value, --.
Col. 20, line 2, delete "value" and insert -- value, --.
Col. 17, line 3, delete "space" and insert -- space, --.
Col. 17, line 44, delete "space" and insert -- space, --.
Col. 18, line 21, delete "space" and insert -- space, --.

UNITED STATES PATENT AND TRADEMARK OFFICE
CERTIFICATE OF CORRECTION

PATENT NO. : 5,890,021
DATED : March 30, 1999
INVENTOR(S) : Hitoshi Onoda

It is certified that error appears in the above-identified patent and that said Letters Patent is hereby corrected as shown below:

Col. 19, line 7, delete "space" and insert -- space, --.
Col. 20, line 3, delete "space" and insert -- space, --.

Signed and Sealed this

Twenty-eighth Day of December, 1999

Q. TODD DICKINSON

Attest:

Attesting Officer    Acting Commissioner of Patents and Trademarks